No. 832,378. PATENTED OCT. 2, 1906.
D. HALL.
LAP ROBE FOR AUTOMOBILES.
APPLICATION FILED FEB. 5, 1906.

WITNESSES:
George J. Schwartz
Fred J. Kinsey

INVENTOR:
David Hall.
BY
Chas. E. Lord
ATTORNEY.

UNITED STATES PATENT OFFICE.

DAVID HALL, OF NORWOOD, OHIO.

LAP-ROBE FOR AUTOMOBILES.

No. 832,378.  Specification of Letters Patent.  Patented Oct. 2, 1906.

Application filed February 5, 1906. Serial No. 299,493.

*To all whom it may concern:*

Be it known that I, DAVID HALL, a citizen of the United States, residing at Norwood, in the county of Hamilton and State of Ohio, have invented certain new and useful Improvements in Lap-Robes for Automobiles, of which the following is a full, clear, and exact specification.

My invention relates to improvements in lap-robes or storm-aprons, which are especially adapted for use in connection with automobiles having a steering-post in front of the chauffeur's seat.

In automobiles provided with the customary steering-post it has heretofore been practically impossible to operate the automobile satisfactorily in cold or inclement weather, due to the difficulty of keeping a lap-robe or storm-apron of the ordinary form in an effective position. In the majority of modern automobiles there are many controlling levers and pedals and same are usually so located and arranged that one must reach beyond the lap-robe with hands or feet in order to operate them. This movement of the operator or chauffeur in operating the vehicle disarranges and displaces the ordinary lap-robe and renders it extremely ineffective and practically worthless.

The object of my present invention is to overcome the difficulties above enumerated and to produce an effective and efficient lap-robe and storm-apron which is simple and inexpensive.

In carrying my invention into effect I provide a lap-robe which surrounds the steering-post and is adapted to cover the controlling pedals and levers in the immediate vicinity of the steering-post, so that the chauffeur may operate any lever or pedal without disarranging the lap-robe or throwing same out of its proper protective position.

The invention further comprises improvements in the details and arrangement of my improved lap-robe, which will be hereinafter pointed out, and more specifically stated in the appended claims.

Figure 1:
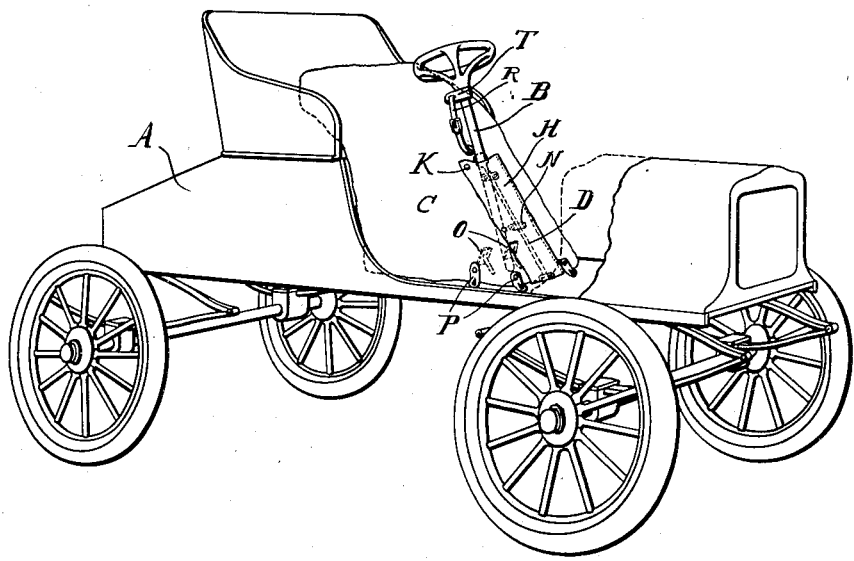
Figure 2:
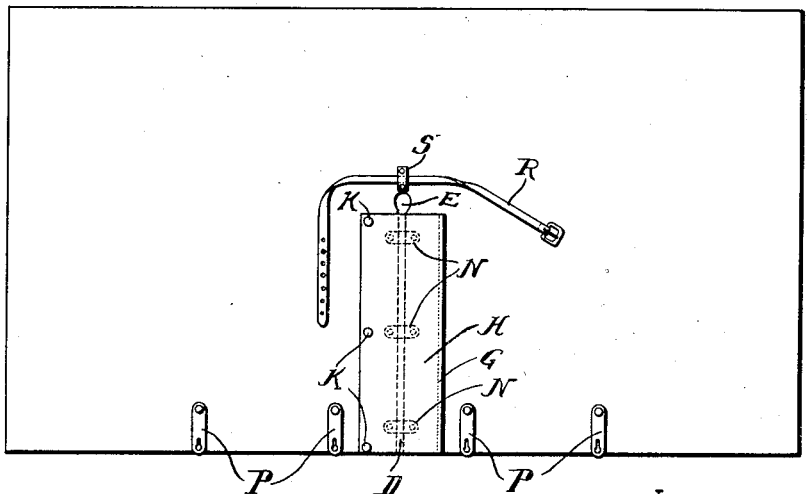

In the accompanying drawings, which form part of this specification, I have illustrated, in Figure 1, a perspective view of part of an automobile or vehicle with my improved lap-robe in position therein, and in Fig. 2 a view of the lap-robe removed from the machine.

In Fig. 1 the automobile or other vehicle is shown at A and is provided with the customary steering-post B. The steering-post is surrounded by my improved storm-apron or lap-robe C, the forward part of the vehicle being broken away to show said apron or robe more clearly. This robe or apron may be made of any desirable light material for protection against dust and dirt during the summer or dry season, of heavy or heat-insulating material for protection against the cold during the winter, or of oil-skin or other waterproof material for protection during stormy or inclement weather.

As will be clearly seen in Fig. 2, the robe is slit at D from the lower edge to a point E at any desired distance from said lower edge. Firmly fastened at G to the material of the robe adjacent to the split portion D is a flap H, which is provided with clasps K or other means for fastening it to the material of the robe on the other side of the slit in a manner so that the flap may be readily opened. It will thus be seen that the robe may be placed in position so as to surround the steering-post B, as shown in Fig. 1. To bring the edges of the split portion of the robe together to reduce the size of the slit, the short straps N may be employed. These straps, however, may be omitted, if desired. The straps P are provided for the purpose of attaching the lower edge of the robe to the floor of the vehicle. These straps P are so arranged that the pedals O and other operating-levers on or near the floor of the vehicle are not interfered with and are operable without reaching beyond the robe. It will also be seen that the robe may be easily placed in position or removed and that when in position it effectively protects the lap and lower limbs of the operator without interfering in any way with the operation of the various controlling devices and without becoming displaced or disarranged by any movement of the operator or other occupant of the vehicle. To further assist in holding the robe in its most effective position, I provide a strap R, attached to the robe at S and adapted to be connected with the steering-post at T or at any other convenient point.

Having thus described my invention, what I claim, and desire to secure by Letters Patent of the United States, is—

1. A lap-robe for automobiles which is slit to permit it passing around the steering-post of the automobile, and a flap for covering said slit portion after the robe has been placed in position around said steering-post.

2. A lap-robe for automobiles which is slit to permit it passing around the steering-post of the automobile, and a flap for covering said slit portion after the robe has been placed in position around said steering-post, and means for fastening said robe to the floor of the automobile.

3. A lap-robe for automobiles which is slit to permit it passing around the steering-post of the automobile, and a flap for covering said slit portion after the robe has been placed in position around said steering-post, and means for adjustably fastening the robe to the steering-post to prevent same from dropping down.

In testimony whereof I affix my signature in the presence of two witnesses.

DAVID HALL.

Witnesses:
    CHAS. E. LORD,
    FRED J. KINSEY.